(12) United States Patent
Fukuda et al.

(10) Patent No.: US 10,150,916 B2
(45) Date of Patent: Dec. 11, 2018

(54) SOIL EROSION PREVENTER HAVING HIGH FREEZING AND THAWING STABILITY

(71) Applicant: Denka Company Limited, Tokyo (JP)

(72) Inventors: Koichi Fukuda, Ichihara (JP); Hironori Konishi, Ichihara (JP); Kazuhiro Kote, Ichihara (JP)

(73) Assignee: DENKA COMPANY LIMITED, Tokyo (JP)

(*) Notice: Subject to any disclaimer, the term of this patent is extended or adjusted under 35 U.S.C. 154(b) by 0 days.

(21) Appl. No.: 15/768,318

(22) PCT Filed: Nov. 30, 2016

(86) PCT No.: PCT/JP2016/085477
§ 371 (c)(1),
(2) Date: Apr. 13, 2018

(87) PCT Pub. No.: WO2017/094747
PCT Pub. Date: Jun. 8, 2017

(65) Prior Publication Data
US 2018/0320070 A1    Nov. 8, 2018

(30) Foreign Application Priority Data

Nov. 30, 2015  (JP) .................................. 2015-232653

(51) Int. Cl.
*C09K 17/20* (2006.01)
*E02B 3/12* (2006.01)
*E02D 17/20* (2006.01)

(52) U.S. Cl.
CPC ............... *C09K 17/20* (2013.01); *E02B 3/12* (2013.01); *E02D 17/20* (2013.01)

(58) Field of Classification Search
CPC ............ C09K 17/20; E02B 3/12; E02D 17/20
See application file for complete search history.

(56) References Cited

U.S. PATENT DOCUMENTS

| | | | |
|---|---|---|---|
| 3,651,649 A | 3/1972 | Najvar et al. | 45/14 |
| 5,969,025 A * | 10/1999 | Corzani | A61L 15/24 524/272 |
| 7,906,577 B2 | 3/2011 | Zong et al. | 524/497 |
| 8,580,883 B2 | 11/2013 | Zong et al. | 524/497 |
| 8,702,343 B1 * | 4/2014 | Vitale | E01C 7/358 404/17 |
| 8,889,774 B2 | 11/2014 | Zong et al. | 524/151 |
| 9,388,323 B2 | 7/2016 | Zong et al. | 524/543 |
| 2002/0161071 A1 * | 10/2002 | Mills | C04B 28/06 524/2 |
| 2009/0131562 A1 | 5/2009 | Kanderi | 524/14 |
| 2009/0186968 A1 | 7/2009 | Zong et al. | 524/131 |
| 2009/0186972 A1 | 7/2009 | Zong et al. | 524/369 |
| 2010/0016485 A1 | 1/2010 | Zong et al. | 524/131 |
| 2011/0086961 A1 | 4/2011 | Zong et al. | 524/375 |
| 2011/0274490 A1 * | 11/2011 | Vitale | C04B 26/06 404/82 |
| 2011/0318115 A1 * | 12/2011 | Vitale | C09K 17/20 405/264 |
| 2012/0329907 A1 * | 12/2012 | Hong | C08J 3/12 523/401 |
| 2015/0133604 A1 | 5/2015 | Zong et al. | 133/8 |
| 2017/0174988 A1 | 6/2017 | Fukuda et al. | 218/8 |

FOREIGN PATENT DOCUMENTS

| | | |
|---|---|---|
| JP | S 60-4587 A | 1/1985 |
| JP | 2000-129259 A | 5/2000 |
| JP | 4048800 B2 | 12/2007 |
| JP | 2011-510135 A | 3/2011 |
| JP | WO 2015/122333 A1 | 8/2015 |
| KR | 10-1088355 B1 | 12/2011 |

OTHER PUBLICATIONS

International Search Report dated Jan. 10, 2017, issued by the Japanese Patent Office in corresponding application PCT/JP2016/085477.

* cited by examiner

*Primary Examiner* — Benjamin F Fiorello
(74) *Attorney, Agent, or Firm* — Stein IP, LLC

(57) ABSTRACT

The present invention provides a soil erosion prevention agent which is excellent in the freeze-thaw stability while maintaining the soil erosion prevention effect. A soil erosion prevention agent of the present invention comprises a water-borne resin emulsion; and a water-soluble polymer, wherein a content of the water-borne resin emulsion is 99 to 93 mass %, a content of the water-soluble polymer is 1 to 7 mass %, and the water-borne resin emulsion contains 0.01 to 0.10 parts by mass of a structural unit derived from a polyfunctional monomer with respect to 100 parts by mass of a structural unit derived from a main monomer.

7 Claims, No Drawings

SOIL EROSION PREVENTER HAVING HIGH FREEZING AND THAWING STABILITY

CROSS-REFERENCE TO RELATED APPLICATIONS

This application is a national stage of International Application No. PCT/JP2016/085477 filed Nov. 30, 2016, which claims the benefit of priority to Japanese Application No. 2015-232653, filed Nov. 30, 2015, in the Japanese Patent Office, the disclosure of which are incorporated herein in their entireties by reference.

TECHNICAL FIELD

The present invention relates to a soil erosion prevention agent suitably used to prevent soil erosion from a slope surface and the like formed by filled soil and cut soil in construction of developed land, road, dam and the like.

BACKGROUND ART

At the construction site of developed land, road, dam and the like, soil cutting and soil filling are performed to form a slope surface. When such slope surface is left as it is, the slope surface gets eroded by rain and weathering, thereby causing accidents such as landslide and rock fall. Accordingly, in order to prevent erosion of soil, Patent Literature 1 discloses formulating drying inhibitor for soil comprising water-swelling and water-absorbing resin, surfactant, and synthetic resin emulsion into a spraying material by a ratio of 0.5 to 1.5 kg per 1 m³ of the spraying material, and spraying such spraying material onto the slope surface.

Materials used for a construction of a slope surface are sometimes stored in warehouses and the like, but they are sometimes, after being carried on site, stored by covering with sheets and like. Since it is below the freezing point in the winter in a cold district depending on the storage place, there is a problem that the soil erosion prevention agent freezes and coagulates.

CITATION LIST

Patent Literature

[Patent Literature 1] JP4048800B2
[Patent Literature 2] JP2000-129259A
[Patent Literature 3] JP2011-510135A

SUMMARY OF INVENTION

Technical Problem

Patent Literature 1 describes a soil erosion prevention agent excellent in freeze-thaw stability. Moreover, Patent Literature 2 relates to a polyacrylamide-based resin, Patent Literature 3 uses an alkoxylated compound as a constituent. However, there is no known technique for improving freeze-thaw stability of vinyl acetate resin emulsion.

The present invention has been made by taking the afore-mentioned circumstances into consideration. The present invention provides a soil erosion prevention agent which can improve the freeze-thaw stability while maintaining the soil erosion prevention effect.

Solution to Problem

The present inventions are as follows.
(1) A soil erosion prevention agent comprising: a water-borne resin emulsion; and a water-soluble polymer, wherein a content of the water-borne resin emulsion is 99 to 93 mass %, a content of the water-soluble polymer is 1 to 7 mass %, and the water-borne resin emulsion contains 0.01 to 0.10 parts by mass of a structural unit derived from a polyfunctional monomer with respect to 100 parts by mass of a structural unit derived from a main monomer.
(2) The soil erosion prevention agent of (1), wherein the water-borne resin emulsion contains 0.05 to 0.10 parts by mass of a structural unit derived from a polyfunctional monomer with respect to 100 parts by mass of a structural unit derived from a main monomer.
(3) The soil erosion prevention agent of (1) or (2), wherein the water-borne resin emulsion contains a structural unit derived from vinyl acetate.
(4) The soil erosion prevention agent of any one of (1) to (3), comprising an ethylene-vinyl acetate copolymer emulsion.
(5) A greening method using the soil erosion prevention agent of any one of (1) to (4).
(6) A greening method using 1 to 10 kg of the soil erosion prevention agent of any one of (1) to (4) with respect to 1 m³ of the spraying material.
(7) A spraying material comprising 1 to 10 kg of the soil erosion prevention agent of any one of (1) to (4) with respect to 1 m³ of the spraying material.

Advantageous Effects of Invention

Experiments by the present inventors revealed that the freeze-thaw stability becomes better as the polyfunctional monomer content contained in the water-borne resin emulsion increases. It is also revealed that when the soil erosion prevention agents comprise the same amount of the water-soluble polymer, the freeze-thaw stability depends on the content of the water-borne resin emulsion and an amount of the polyfunctional monomer content contained in the water-borne resin emulsion. In particular, when the water-borne resin emulsion contains 0 01 to 0.10 parts by mass of a structural unit derived from a polyfunctional monomer with respect to 100 parts by mass of a structural unit derived from a main monomer, excellent effects can be demonstrated.

DESCRIPTION OF EMBODIMENTS

Hereinafter, the embodiments of the present invention will be explained in detail.

A soil erosion prevention agent of the present invention comprises: a water-borne resin emulsion; and a water-soluble polymer, wherein a content of the water-soluble polymer is 1 to 7 mass %, and the water-borne resin emulsion contains 0.01 to 0.10 parts by mass of a structural unit derived from a polyfunctional monomer with respect to 100 parts by mass of a structural unit derived from a main monomer. Preferably, the water-borne resin emulsion contains 0.05 to 0.10 parts by mass of a structural unit derived from a polyfunctional monomer with respect to 100 parts by mass of a structural unit derived from a main monomer.

The water-borne resin emulsion is not particularly limited, as long as water is a dispersion medium and a resin is a dispersoid. The water-borne resin emulsion prepared by polymerization using, as the main monomer, a single or a plurality of various olefin ompounds such as vinyl acetate, acrylic acid ester, styrene, ethylene, butadiene may be used. Specifically, examples of the water-borne resin emulsion include a vinyl acetate resin emulsion, a vinyl acetate copolymer emulsion, an acrylate ester resin emulsion, a styrene acrylate copolymer emulsion, an ethylene-vinyl acetate copolymer emulsion, a styrene-butadiene copolymer emulsion, a vinylidene resin emulsion, a polybutene resin emulsion, an acrylonitrile-butadiene resin emulsion, a methacrylate-butadiene resin emulsion, an asphalt emulsion, an epoxy resin emulsion, an urethane resin emulsion, a silicone resin emulsion. Among these, emulsions containing a structure unit derived from vinyl acetate such as the vinyl acetate resin emulsion, the vinyl acetate copolymer emulsion, the ethylene-vinyl acetate copolymer emulsion are preferred, and the ethylene-vinyl acetate copolymer emulsion is more preferred.

The polyfunctional monomer in the present invention means a monomer capable of supplying two or more ethylenic double bonds when the monomer becomes a constituent component of the copolymer, and specific examples thereof include triallyl cyanurate, triallyl isocyanurate, diallyl phthalate, and the like.

There is no particular limitation regarding the manufacturing method of the water-borne resin emulsion. For example, the emulsion can be manufactured by adding an emulsifier and monomer into a dispersion medium, the dispersion medium containing water as a main component, and then allowing the monomer to undergo emulsion polymerization with agitation. The toluene-insoluble matter of the emulsion obtained can be adjusted by the type and addition rate of monomer used in the manufacturing process. As the emulsifier, ionic (cationic, anionic, zwitterionic) surfactant and non-ionic (nonionic) surfactant can be mentioned for example. As the non-ionic surfactant, low molecular surfactant such as alkyl glycoside, or high molecular surfactant such as polyethylene glycol and polyvinyl alcohol can be mentioned for example, and high molecular surfactant is preferable. Regarding the high molecular surfactant, the ones comprising polyvinyl alcohol are especially preferable, and the average polymerization degree is 200 to 2500 for example, preferably 400 to 2200, and more preferably 500 to 2000. The performance of polyvinyl alcohol as the emulsifier and dispersant becomes high when the average polymerization degree is high. Accordingly, polyvinyl alcohol having an average polymerization degree suitable to obtain the emulsion with desired degree of dispersion should be used. In addition, regarding the polyvinyl alcohol, a plurality of polyvinyl alcohols having a different average polymerization degree can be used in combination. The degree of saponification of the polyvinyl alcohol is not particularly limited, and is 70% or higher for example, preferably 80 to 95%. When the degree of saponification is too low, solubility with water becomes extremely low, and thus industrial utilization becomes difficult since a special dissolving process would be required. When the degree of saponification is low, the performance of polyvinyl alcohol as the emulsifier and dispersant becomes high. Accordingly, polyvinyl alcohol having a degree of saponification suitable to obtain the emulsion with desired degree of dispersion should be used. In addition, a plurality of emulsifier can be used in combination. The amount of emulsifier added is not particularly limited, and is 0.5 to 20 parts by mass with respect to 100 parts by mass of dispersant for example, and 1 to 10 parts by mass with respect to 100 parts by mass of dispersant is preferable. When the amount of emulsifier added is large, the performance of the emulsifier as the emulsifier and dispersant becomes high. Accordingly, the amount of emulsifier added is suitably adjusted so that an emulsion with desired degree of dispersion is obtained.

The solid content of the soil erosion prevention agent is 25 to 60 mass %, preferably 30 to 40 mass %. When the solid content is too low, the amount of polymer contained in the soil erosion prevention agent is too small. Accordingly, the soil erosion prevention effect becomes low. On the other hand, when the solid content is too high, the viscosity becomes too high, and it becomes difficult to formulate the emulsion into the spraying material and the freeze-thaw stability tends to decrease.

Examples of the water-soluble polymer contained in the soil erosion prevention agent include, it is not limited, cellulose derivatives such as methylcellulose, ethylcellulose, hydroxymethylcellulose, hydroxypropylmethylcellulose, hydroxybutylmethylcellulose, hydroxyethylcellulose, carboxymethylcellulose, aminomethylhydroxypropylcellulose, aminoethylhydroxypropylcellulose and the like; starch, carrageenan, mannan, agarose, dextran, tragacanth, pectin, glue, alginic acid or a salt thereof; gelatin; polyvinyl pyrrolidone; polyacrylic acid or a salt thereof; polymethacrylic acid or a salt thereof; acrylamide such as polyacrylamide or polymethacrylamide; hyaluronic acid or a salt thereof; chondroitin sulfate or a salt thereof; polyvinyl alcohol, polyethylene imine, polyethylene oxide, polyethylene glycol, polypropylene glycol, glycerin. A plurality of the above water-soluble polymers can be used in combination. Nonionic surfactants which are miscible with water may also be used, and examples of the nonionic surfactants include polyoxyethylene alkylaryls ethers or polyoxyethylene alkyl ethers such as polyoxyethylene nonylphenyl ether, polyoxyethylene styrenated phenyl ether, polyoxyethylene oleyl ether, polyoxyethylene lauryl ether; polyoxyethylene fatty acid esters such as polyethylene glycol monolaurate, polyethylene glycol monostearate and polyethylene glycol monooleate; oxyethylene/oxypropylene block copolymer, and the like.

The freeze-thaw stability of the water-borne resin emulsion improves as the content of the water-soluble polymer in the soil erosion prevention agent increases, while the effect of preventing soil erosion tends to decrease. Therefore, the water-soluble polymer contained in the soil erosion prevention agent is preferably 1 to 7 mass %, more preferably 1 to 5 mass %.

Next, the method for utilizing the soil erosion prevention agent of the present invention will be explained. The soil erosion prevention agent can be sprayed onto the plane to be protected alone, or can be sprayed together with a spraying material which is a mixture including soil as a main component, seed, fertilizer and the like, by mixing the soil erosion prevention agent into the spraying material. There is no particular limitation regarding the construction method for spraying the spraying material onto the plane to be sprayed. For example, hydroseeding method, soil blasting method, base blasting method and the like can be mentioned. Otherwise, when the plane to be sprayed is large, seeding by spraying using aircrafts such as helicopters can be performed.

There is no particular limitation regarding the spraying material used. For example, organic material such as bark compost, sphagnum peat and the like or sandy soil is blended with seed, fertilizer and the like, and is used as the spraying material.

There is no particular limitation regarding the addition amount of the soil erosion prevention agent to spraying material. Here, it is preferred that the soil erosion prevention agent is added so that the added soil erosion prevention agent is 1 to 10 kg, preferably 4 to 6 kg with respect to 1 $m^3$ of the spraying material.

EXAMPLES

Hereinafter, Examples of the present invention will be described. Unless otherwise noted, "parts" and "%" means "parts by mass" and "mass %, respectively.

Manufacturing Example 1

Water-Borne Resin Emulsion 1

To a high pressure polymerization tank equipped with an agitator, a solution prepared by dissolving, in 100 parts of water, 1.6 parts of DENKA POVAL B-05 (saponification degree of 88mol%, average polymerization degree of 600, available from DENKA Company Limited), 2.7 parts of DENKA POVAL B-17 (saponification degree of 88mol%, average polymerization degree of 1700, available from DENKA Company Limited) as an emulsifier, and 0.1 parts of formamidinesulfinic acid, 0.2 parts of sodium acetate, 0.005 parts of ferrous sulfate heptahydrate, and 0.01 parts of tetrasodium ethylenediaminetetraacetate as auxiliaries was introduced. Subsequently, 57 parts of vinyl acetate monomer, 19 parts of ethylene, and 0.06 parts of triallyl cyanurate monomer were added under agitation. After raising the internal solution temperature to 55° C., 2.7 parts of 5% t-butyl hydroperoxide aqueous solution was added continuously and polymerization was performed. During polymerization, 25 parts of vinyl acetate monomer and 0.02 part of triallyl cyanurate monomer were separately added. The polymerization was maintained until the unreacted vinyl acetate monomer reached less than 2%.

After the polymerization, the remaining ethylene was purged, and the unreacted vinyl acetate monomer contained in the emulsion obtained was removed under reduced pressure. Accordingly, the water-borne resin emulsion 1 which contains 0.10 parts by mass of a polyfunctional monomer with respect to a main monomer, as shown in table 1.

Manufacturing Examples 2 to 6

Water-Borne Resin Emulsions 2 to 6

The water-borne resin emulsions 2 to 6 were manufactured with conditions corresponding to the conditions of Manufacturing Example 1, according to Table 1. The water-borne resin emulsion 2 which contains 0.05 parts by mass of the polyfunctional monomer with respect to the main monomer was obtained. The water-borne resin emulsion 3 which contains 0.01 parts by mass of the polyfunctional monomer with respect to the main monomer was obtained. The water-borne resin emulsion 4 which contains none of the polyfunctional monomer was obtained. The water-borne resin emulsion 5 which contains 0.20 parts by mass of the polyfunctional monomer with respect to the main monomer was obtained. The water-borne resin emulsion 6 which contains 0.10 parts by mass of the polyfunctional monomer with respect to the main monomer was obtained.

Preparation of Soil Erosion Prevention Agent

Example 1

PEG400 (available from Junsei Chemical Co., Ltd.) as the water-soluble polymer was added to the water-borne resin emulsion 1 obtained in Manufacturing Example 1 so that the soil erosion prevention agent has a predetermined content (mass %) shown in Table 2, and water (pure water) was also added so that the solid content of the soil erosion prevention agent is 30 mass %. Then, the soil erosion prevention agent of Example 1 was obtained. In each example of Table 2, "*" means that the water-soluble polymer described in the same row was used.

Preparation of Soil Erosion Prevention Agents

Examples 2 to 14 and Comparative Examples 1 to 3

The soil erosion prevention agents of Examples 2 to 14 and Comparative Examples 1 to 3 were prepared according to the composition and the solid content described in Table 2. As the water-soluble polymers, PEG 400 (available from Junsei Chemical Co., Ltd.), PEG 20000 (available from Junsei Chemical Co., Ltd.), Denka Poval B-05 (saponification degree 88 mol %, average degree of polymerization 600, available from DENKA Company Limited), Denka Poval B-17 (saponification degree 88 mol %, average degree of polymerization 1700, available from DENKA Company Limited), Denka Poval B-33 (saponification degree 88 mol %, average polymerization degree 3,300, available from DENKA Company Limited), hydroxyethyl cellulose (2% aqueous solution viscosity (20° C.): 200-300 mPa·s, available from Tokyo Chemical Industry Co., Ltd.), carboxymethyl cellulose cellogen 7A (available from DKS Co., Ltd.) were respectively used.

For each soil erosion prevention agent, freeze-thaw stability and soil erosion prevention performance were evaluated, and the results are shown in Table 2. The freeze-thaw stability and the soil erosion prevention performance were shown as "F" and "E", respectively.

(Measurement of Toluene Insoluble Matter)
(1) 10 g of emulsion is coated on a fluororesin plate (area of about 100 cm$^2$) and dried at 23° C. for 5 days to obtain a dry film.
(2) 1 g of the dry film finely cut into 5 mm square is put into a screw tube, the screw tube is filled with 50 g of toluene and sealed tightly.
(3) The screw tube is shaken for 5 hours in a 50° C. hot water bath.
(4) The resulted toluene solution is filtered through 200 mesh wire net, the insoluble matter separated (and recovered) is dried in a draft at 23° C. overnight, and then dried in a dryer (105° C.) for 3 hours, and the dry weight of the insoluble matter recovered is measured.
(5) The toluene insoluble matter is calculated by a following equation.

> Toluene insoluble matter (%)=100×(weight of the insoluble matter recovered)/(weight of charged film)

(Evaluation of Freeze-Thaw Stability)
(1) 50 g of the emulsion is taken in a 100 ml container.
(2) The container is left for 16 hours in an environmental testing machine (−20° C.) and frozen.
(3) The container is taken out of the environmental testing machine and left in a hot water bath at 30° C. for 1 hour to be melted.
(4) The state after melting is visually observed and the extent of aggregation is evaluated according to the following criteria.
 a: equivalent to emulsion before freezing
 b: Fluid flowing, but aggregates are observed
 c: It becomes a sponge and does not flow (Evaluation of Soil Erosion Prevention Effect)

Next, a vegetation base made by a thick layer base material spraying method formulated with the prepared sample was constructed, and the amount of soil that flow by the rainfall test was measured.

(1) Blending: Into a container, 7L of bark compost (available from Fujimi-ryokka co. jp, Fujimi-soil No. 5), 21 g of high analysis compound fertilizer (available from Nittofc Co., Ltd., 15-15-15), 3.5 g of seeds (available from KANEKO SEEDS CO., LTD., Italian ryegrass), and 21 g of the soil erosion prevention agent were added, and the mixture was kneaded to prepare a vegetation base material.

(2) Construction: The vegetation base material was filled into a wooden frame (30 cm×30 cm rectangle, height 10 cm) and was smoothed. Then, the vegetation base material was pressured to half the volume from the upper side.

(3) Maturing: The wooden frame was removed, and the vegetation base material was allowed to mature overnight in a room kept at 23° C.

(4) Rainfall : Water was applied to the matured vegetation base using a watering can. The vegetation base was inclined by 9°, and water was applied from a height of 50 cm with an intensity of 200 mm per 1 hour for 30 minutes.

The amount of the soil flown was visually observed and evaluated as follows.
a: Soil flown is almost not observed.
b: Soil flown is partially observed.
c: Soil flown is observed all over.

According to Table 2, it has been demonstrated that the freeze-thaw stability of the soil erosion prevention agent improves as the content of water-soluble polymer increases, and the effect of preventing soil erosion tends to decrease. It has also been demonstrated that with the same content of the water-soluble polymer, the freeze-thaw stability of the soil erosion prevention agent is improved, as the content of the polyfunctional monomer contained in the water-borne resin emulsion is higher, even when the content of the water-soluble polymer is small.

Accordingly, it has been demonstrated that by using as the soil erosion prevention agent comprising: a water-borne resin emulsion; and a water-soluble polymer, wherein a content of the water-soluble polymer is 1 to 7 mass %, and the water-borne resin emulsion contains 0.01 to 0.10 parts by mass of a structural unit derived from a polyfunctional monomer with respect to 100 parts by mass of a structural unit derived from a main monomer., the freeze-thaw stability can be improved while maintaining the soil erosion prevention effect.

TABLE 1

| | | Water-Borne Resin Emulsion | | | | | |
|---|---|---|---|---|---|---|---|
| | | 1 | 2 | 3 | 4 | 5 | 6 |
| The number of polyfunctional monomer to main monomer (parts by mass) | | 0.10 | 0.05 | 0.01 | 0 | 0.20 | 0.10 |
| Initial preparation | Pure water | 100 | 100 | 100 | 100 | 100 | 100 |
| | DENKA POVAL B-05 | 1.6 | 1.6 | 1.6 | 1.6 | 1.6 | 1.6 |
| | DENKA POVAL B-17 | 2.7 | 2.7 | 2.7 | 2.7 | 2.7 | 2.7 |
| | Formamidinesulfinic acid | 0.1 | 0.1 | 0.1 | 0.1 | 0.1 | 0.1 |
| | Sodium acetate | 0.2 | 0.2 | 0.2 | 0.2 | 0.2 | 0.2 |
| | Ferrous sulfate heptahydrate | 0.005 | 0.005 | 0.005 | 0.005 | 0.005 | 0.005 |
| | Tetrasodium ethylenediaminetetraacetate | 0.01 | 0.01 | 0.01 | 0.01 | 0.01 | 0.01 |
| | Vinyl acetate monomer | 57 | 57 | 57 | 57 | 57 | 57 |
| | Ethylene monomer | 19 | 19 | 19 | 19 | 19 | 19 |
| | Triallyl cyanurate monomer | 0.06 | 0.03 | 0.006 | 0 | 0.12 | |
| | Triallyl isocyanurate monomer | | | | | | 0.06 |
| Separately added monomer | Vinyl acetate monomer | 25 | 25 | 25 | 25 | 25 | 25 |
| | Triallyl cyanurate monomer | 0.02 | 0.01 | 0.002 | 0 | 0.04 | |
| | Triallyl isocyanurate monomer | | | | | | 0.02 |
| Separately added additive | 5 mass % t-butyl hydroperoxide aqueous solution | 2.7 | 2.7 | 2.7 | 2.7 | 2.7 | 2.7 |

TABLE 2

| | | Example | | | | | | | | |
|---|---|---|---|---|---|---|---|---|---|---|
| | | 1 | 2 | 3 | 4 | 5 | 6 | 7 | 8 | 9 |
| Emulsion | Water-Borne Resin Emulsion No. | 1 | 1 | 1 | 1 | 1 | 1 | 1 | 1 | 1 |
| | Multifunctional monomer (part) | 0.10 | 0.10 | 0.10 | 0.10 | 0.10 | 0.10 | 0.10 | 0.10 | 0.10 |
| Water soluble polymer | PEG400 | * | | | | | | | | |
| | PEG20000 | | * | | | | | | | |
| | DENKA POVAL B-05 | | | * | | | | | | |
| | DENKA POVAL B-17 | | | | * | | | | | |
| | DENKA POVAL B-33 | | | | | * | | | | |
| | DENKA POVAL B-05+ B-17(1:1) | | | | | | * | | | |
| | DENKA POVAL B-17+ B-33(1:1) | | | | | | | * | | |
| | Hydroxyethyl cellulose | | | | | | | | * | |
| | Carboxymethyl cellulose | | | | | | | | | * |
| | Evaluation item | F | E | F | E | F | E | F | E | F | E | F | E | F | E | F | E | F | E |

TABLE 2-continued

| Measurement | Water-soluble polymer content (mass %) | 0 | c | a | c | a | c | a | c | a | c | a | c | a | c | a | c | a |
|---|---|---|---|---|---|---|---|---|---|---|---|---|---|---|---|---|---|---|
| | | 1 | a | a | a | a | a | a | a | a | a | a | a | a | a | a | a | a |
| | | 2 | a | a | a | a | a | a | a | a | a | a | a | a | a | a | a | a |
| | | 3 | a | a | a | a | a | a | a | a | a | a | a | a | a | a | a | a |
| | | 4 | a | a | a | a | a | a | a | a | a | a | a | a | a | a | a | a |
| | | 5 | a | a | a | a | a | a | a | a | a | a | a | a | a | a | a | a |
| | | 7 | a | b | a | b | a | b | a | b | a | b | a | b | a | b | a | b |
| | | 10 | a | c | a | c | a | c | a | c | a | c | a | c | a | c | a | c |

|  |  |  | Example |  |  |  |  | Comparative Example |  |  |
|---|---|---|---|---|---|---|---|---|---|---|
|  |  |  | 10 | 11 | 12 | 13 | 14 | 1 | 2 | 3 |
| Emulsion | Water-Borne Resin Emulsion No. | | 2 | 3 | 3 | 3 | 6 | 4 | 4 | 5 |
| | Multifunctional monomer (part) | | 0.05 | 0.01 | 0.01 | 0.01 | 0.10 | 0 | 0 | 0.20 |
| Water soluble polymer | PEG400 | | * | * | | | * | * | | * |
| | PEG20000 | | | | | | | | | |
| | DENKA POVAL B-05 | | | | | | | | | |
| | DENKA POVAL B-17 | | | | * | | | | * | |
| | DENKA POVAL B-33 | | | | | | | | | |
| | DENKA POVAL B-05+ B-17(1:1) | | | | | | | | | |
| | DENKA POVAL B-17+ B-33(1:1) | | | | | | | | | |
| | Hydroxyethyl cellulose | | | | | * | | | | |
| | Carboxymethyl cellulose | | | | | | | | | |
| Evaluation item | | | F  E | F  E | F  E | F  E | F  E | F  E | F  E | F  E |
| Measurement | Water-soluble polymer content (mass %) | 0 | c  a | c  a | c  a | c  a | c  a | c  a | c  a | c  b |
| | | 1 | a  a | b  a | b  a | b  a | a  a | c  a | c  a | a  b |
| | | 2 | a  a | a  a | a  a | a  a | a  a | c  a | c  a | a  b |
| | | 3 | a  a | a  a | a  a | a  a | a  a | c  a | c  a | a  b |
| | | 4 | a  a | a  a | a  a | a  a | a  a | c  a | c  a | a  b |
| | | 5 | a  a | a  a | a  a | a  a | a  a | c  a | c  a | a  b |
| | | 7 | a  b | a  b | a  b | a  b | a  b | a  b | a  b | a  b |
| | | 10 | a  c | a  c | a  c | a  c | a  c | a  c | a  c | a  c |

INDUSTRIAL APPLICABILITY

Since the soil erosion prevention agent including the water-borne resin emulsion of the present invention improves the freeze-thaw stability while maintaining the soil erosion prevention effect, it is excellent in storage stability in the winter in a cold district. Accordingly, the soil erosion prevention agent of the present invention can be used for a greening construction and the like.

The invention claimed is:

1. A soil erosion prevention agent comprising:
   a water-borne resin emulsion; and
   a water-soluble polymer, wherein
   a content of the water-borne resin emulsion is 99 to 93 mass %,
   a content of the water-soluble polymer is 1 to 7 mass %, and
   the water-borne resin emulsion contains 0.01 to 0.10 parts by mass of a structural unit derived from a polyfunctional monomer with respect to 100 parts by mass of a structural unit derived from a main monomer.

2. The soil erosion prevention agent of claim 1, wherein the water-borne resin emulsion contains 0.05 to 0.10 parts by mass of a structural unit derived from a polyfunctional monomer with respect to 100 parts by mass of a structural unit derived from a main monomer.

3. The soil erosion prevention agent of claim 1, wherein the water-borne resin emulsion contains a structural unit derived from vinyl acetate.

4. The soil erosion prevention agent of claim 1, comprising an ethylene-vinyl acetate copolymer emulsion.

5. A greening method using the soil erosion prevention agent of claim 1.

6. A greening method using 1 to 10 kg of the soil erosion prevention agent of claim 1 with respect to 1 m3 of the spraying material.

7. A spraying material comprising 1 to 10 kg of the soil erosion prevention agent of claim 1 with respect to 1 m3 of the spraying material.

* * * * *